United States Statutory Invention Registration [19]

[11] Reg. Number: H486

Savioli [43] Published: Jul. 5, 1988

[54] ADJUSTABLE CHEEK REST FOR GUNSTOCKS

[75] Inventor: Giulio V. Savioli, Andover, N.J.

[73] Assignee: The United States of America as represented by the Secretary of the Army, Washington, D.C.

[21] Appl. No.: 811,242

[22] Filed: Feb. 2, 1987

[51] Int. Cl.[4] ..... F41C 23/00
[52] U.S. Cl. ..... 42/73
[58] Field of Search ..... 42/71.01, 73, 75.03

[56] References Cited

U.S. PATENT DOCUMENTS

| | | | |
|---|---|---|---|
| 2,631,398 | 3/1953 | Fantoni | 42/73 |
| 3,710,496 | 1/1973 | Pachmayr et al. | 42/73 X |
| 4,242,826 | 1/1981 | Anschutz | 42/73 |

*Primary Examiner*—Ted L. Parr
*Attorney, Agent, or Firm*—Anthony T. Lane; Harold H. Card, Jr.; Michael C. Sachs

[57] ABSTRACT

The invention is an adjustable cheek rest for a hand-held weapon, mounted on a stock support tube. Specifically, the invention comprises two adjustable tubes with eccentric bores, mounted about the stock support tube so that the stock support tube fits the bore of the inner adjustable tube and the inner adjustable tube fits the bore of the outer adjustable tube. The outer tube functions as the cheek rest. Each adjustable tube may be rotated about its eccentric bore and reversibly locked so as to vary the position of the cheek rest relative to the line of sight.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ADJUSTABLE CHEEK REST FOR GUNSTOCKS

The invention described herein may be manufactured, used and licensed by or for the Government for Governmental purposes without the payment to me of any royalties thereon.

FIELD OF THE INVENTION

The invention relates to the cheek rest portion of the gunstock on a hand-held weapon. A cheek rest is positioned so that the shooter may align one of his eyes with the line of sight which is defined by the front and rear sights mounted on the gun.

BACKGROUND OF THE INVENTION

On many hand-held weapons, the cheek rest portion of the gunstock may not be adjusted. It is merely positioned so that the vision through one eye of the average shooter will be roughly aligned with the line of sight determined by the gun sights. Hence, each individual shooter must adapt to the gun, by pressing his cheek into the cheek rest or by holding it slightly off the cheek rest, or even by placing a hand between his cheek and the cheek rest. Furthermore, the line of sight defined by the gun sights may be changed in order to compensate for elevation or lateral wind. When this is necessary, the shooter must again adjust his cheek position relative to the cheek rest, either vertically, horizontally or both. The necessity for such adjustments may detract from the shooter's ability to aim the weapon.

Hence, there is a need in this field for a cheek rest which may be adjusted to suit each individual shooter, and which may be adjusted in order to compensate for adjustments in the line of sight.

SUMMARY OF THE INVENTION

The present invention provides for a cheek rest which may be adjusted to numerous combinations of vertical and horizontal positions. This is accomplished by designing the cheek rest as a set of two eccentrically oriented adjustable tubes mounted around a stock support tube. The outer adjustable tube, upon which the shooter's cheek rests, contains an eccentric bore through which the inner adjustable tube runs. The inner adjustable tube, in turn, contains an eccentric bore through which the stock support tube runs. Each adjustable tube may be rotated about the tube running through its bore, so that the distance between the axis of the stock support tube and the position at which the shooter's cheek rests may be adjusted to a variety of distances and angles. Furthermore, means by which the shooter may release the tubes so as to adjust them, and then lock them into position, such as threaded locking rings, are provided.

In summary, the invention is a gunstock having an adjustable cheek rest, the gunstock having a front end for joining to the barrel of a gun and a rear end for engaging the shoulder of an operator. A stock support tube extends between the front and rear ends of the gunstock, and has mating front and rear ends. The stock support tube is fixed against rotation relative to the gunstock. An inner adjustable tube, with front and rear ends, has an eccentric bore circumscribing the stock support tube for sliding circumferential contact. An outer adjustable tube, with front and rear ends has an eccentric bore circumscribing said inner adjustable tube for sliding circumferential contact. Finally, means for releasing the inner and outer adjustable tubes to rotate with respect to the stock support tube and with respect to each other, and for locking the three tubes against relative rotation, are provided.

An object of the invention is to provide an adjustable cheek rest for gunstocks which will permit the shooter to initially set distance to suit his physical makeup for the most comfortable and ideal line-of-sight picture, and to allow the shooter to compensate for any change in distance by the adjustment of the cheek rest to predetermined positions.

Another object of the invention is to allow each person the capability of customizing their weapon to suit their needs, whether they are right or left handed shooters.

DETAILED DESCRIPTION OF THE PREFERRED EMBODIMENT

Figure 1:
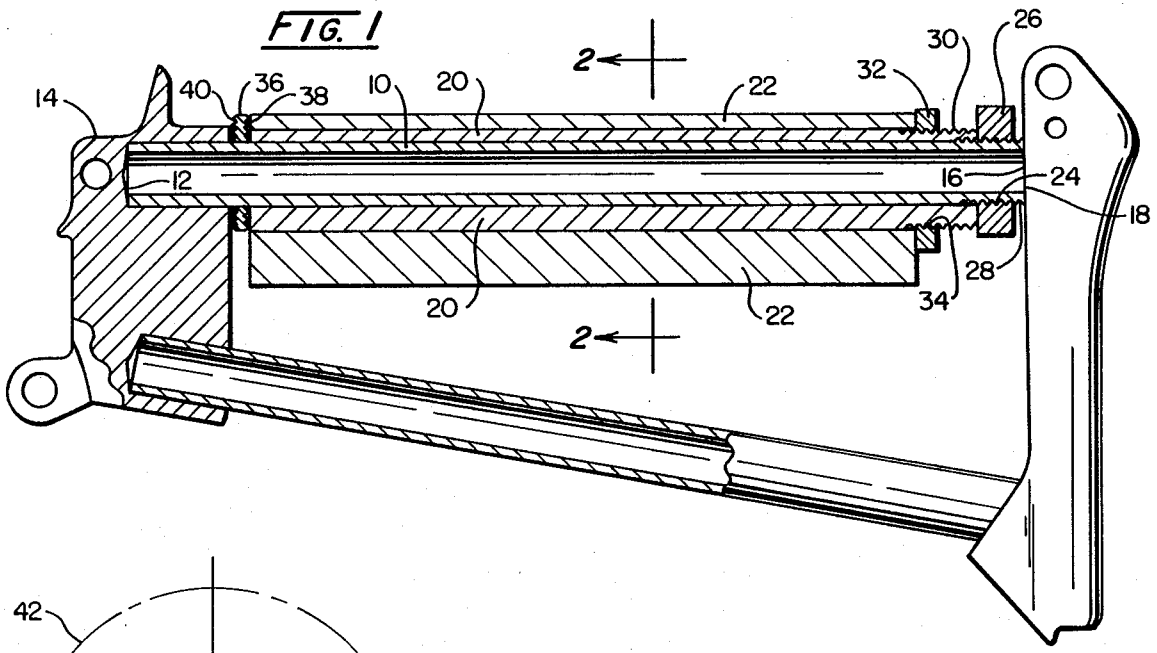
FIG. 1 shows a side view of a gunstock having a cheek rest according to the present invention.

FIG. 1 shows a stock support tube 10 connecting at its front end 12 to the front end 14 of the gunstock, and at its rear end 16 to the rear end of the gunstock 18. An inner adjustable tube 20 is mounted around the stock support tube. An outer adjustable tube 22 is in turn mounted around the inner adjustable tube 20.

An internally threaded 24 locking ring 26 is mounted around the rear end 16 of the stock support tube 10, which tube is externally threaded 28 so as to mate with the internally threaded 24 locking ring 26. A second internally threaded 34 locking ring 32 is mounted in threaded engagement around the externally threaded 30 inner adjustable tube 20.

The front ends of the inner 20 and outer 22 cylindrical tubes and the interfacing surface of the front end 14 of the gunstock mate with serrations 38 and 40 of a lockwasher 36.

The eccentric bore of the inner adjustable tube 20 circumscribes the stock support tube 10. The eccentric bore of the outer adjustable tube 22 in turn circumscribes the inner adjustable tube. Each adjustable tube is free to rotate about its bore, when the locking rings 26 and 32 are released, so as to allow for disengagement of the interfacing serrations 36, 38 and 40 at the front ends of the gunstock and of the adjustable tubes.

Hence, the shooter may loosen the locking rings 26 and 32 and release the interfacing serrations. He may then rotate the inner and outer adjustable tubes so as to achieve the cheek rest position which he desires. He may then tighten the locking rings so as to engage the serrations and lock the adjustable tubes into the desired position. He then may rest his cheek against the outer surface of the outer adjustable tube in preparation for firing the weapon. FIG. 1 illustrates the most preferred embodiment.

The interfacing serrations at the front end of the gunstock and of the adjustable tubes assist in locking the cheek rest into position, but are not essential to the invention. Additionally, it is not necessary that two locking rings be used. Hence, another embodiment of the invention is one similar to that shown in FIG. 1 except that there are no interfacing serrations. Additionally, the invention encompasses an embodiment in which the interfacing serrations are present, but in which there is only a single threaded locking ring mounted around the rear end of the stock support tube. In this embodiment, the inner and outer adjustable tubes are of equal length, and the single locking ring serves to secure both adjustable tubes against the front end of gunstock. Finally, the invention encompasses an embodiment in which only the single threaded locking ring around the stock support tube is used, and furthermore in which no serrations are used. In those embodiments in which no serrations are used, the inner and outer adjustable tubes are secured by the pressure of the tightened locking ring.

Figure 2:
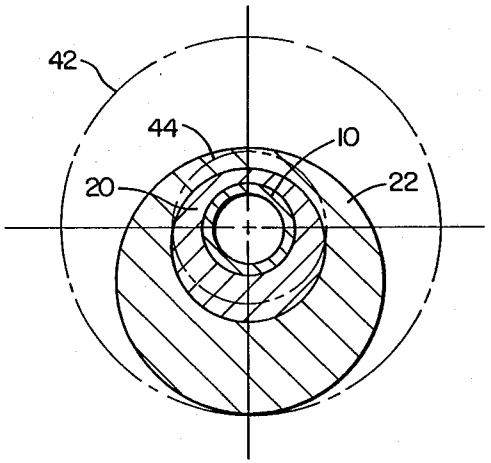
FIG. 2 is a schematic end view, partially in section, of a cheek rest of FIG. 1 showing the fixed end of the stock support tube and various possible positions of the two cylindrical tubes around it.

FIG. 2 schematically shows an end view of the stock support tube 10 and of the inner adjustable tube 20 and the outer adjustable tube 22 mounted around it.

The various cheek rest positions achievable by this doubly eccentric arrangement are illustrated in FIG. 2. As shown, the inner and outer adjustable tubes are each in their uppermost positions. That is, each is positioned so that the point of maximum outer surface distance from the eccentric core is at its uppermost position. This is also the maximum surface distance from the axis of the stock support tube, and may be achieved at any angle around the 360° circumference of that axis. This maximum overall outer surface distance defines the outer limit 42 of the cheek rest position. When the adjustable tubes are so oriented, the overall surface distance in the opposite direction from the axis of the stock support tube is at a minimum. This minimum distance may also be achieved at any angle around the 360° circumference of that axis. This defines the inner limit 44 of the cheek rest position.

By varying the relative rotational positions of the inner and outer adjustable tubes, innumerable cheek rest positions between the outer limit 42 and inner limit 44 may be achieved. Hence, virtually any line of sight and shooter may be accommodated.

It will be appreciated that numerous changes and modifications may be made in the above described embodiments of the invention without departing from the inventive concept. Accordingly, the foregoing description is to be construed in an illustrative and not in a limitative sense.

I claim:

1. A gunstock having an adjustable cheek rest, comprising:

(a) said gunstock having a front end for joining to the barrel of a gun and a rear end for engaging the shoulder of a gun operator, (b) a stock support tube extending between said front and rear ends of said gunstock, with mating front end and rear ends, and being fixed against rotation relative to the gunstock, (c) an inner adjustable tube, with front and rear ends, having an eccentric bore circumscribing said stock support tube for sliding circumferential contact, (d) an outer adjustable tube, with front and rear ends, having an eccentric bore circumscribing said inner adjustable tube for sliding circumferential contact, and (e) means for (1) releasing said inner and outer adjustable tubes to rotate with respect to said stock support tube and with respect to each other and (2) locking said three tubes against relative rotation.

2. An adjustable cheek rest as in claim 1, wherein the front end of each of said inner and outer adjustable tubes may interface with the front end of said gunstock.

3. An adjustable cheek rest as in claim 2, wherein said means for releasing and locking the tubes comprise a first internally threaded locking ring mounted around the rear end of said stock support tube, and wherein said stock support tube is externally threaded so as to mate with said first locking ring.

4. An adjustable cheek rest as in claim 3, wherein said means further comprise a second internally threaded locking ring mounted around the rear end of said inner adjustable tube, and wherein said inner adjustable tube is externally threaded so as to mate with said second threaded locking ring.

5. An adjustable cheek rest as in claim 3, wherein the interfacing surfaces between the front end of said gunstock and the front ends of said inner and outer adjustable tubes are contoured with mating serrations.

6. An adjustable cheek rest as in claim 4, wherein the interfacing surfaces between the front end of said gunstock and the front ends of said inner and outer adjustable tubes are contoured with mating serrations.

* * * * *